(12) United States Patent
Kosmatka et al.

(10) Patent No.: US 10,506,272 B1
(45) Date of Patent: Dec. 10, 2019

(54) PARAMETERIZABLE ENCODING PROFILES

(71) Applicant: Amazon Technologies, Inc., Reno, NV (US)

(72) Inventors: Kristopher Kosmatka, Portland, OR (US); Addie Marie Beseda, Portland, OR (US); Eric Woodruff, Beaverton, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/182,856

(22) Filed: Jun. 15, 2016

(51) Int. Cl.
*H04N 21/2668* (2011.01)
*H04N 21/23* (2011.01)
*H04N 21/262* (2011.01)
*H04N 21/45* (2011.01)

(52) U.S. Cl.
CPC ........ *H04N 21/2668* (2013.01); *H04N 21/23* (2013.01); *H04N 21/26283* (2013.01); *H04N 21/4532* (2013.01)

(58) Field of Classification Search
CPC .......... H04N 21/4227; H04N 21/4532; H04N 21/4542; H04N 21/47214; H04N 21/4751; H04N 21/4753; H04N 21/485; H04N 5/44513; H04N 5/76; H04N 5/781; H04N 7/17318
See application file for complete search history.

(56) References Cited

U.S. PATENT DOCUMENTS

| | | | | |
|---|---|---|---|---|
| 9,535,559 | B2* | 1/2017 | Poornachandran | G06F 3/048 |
| 2007/0162487 | A1* | 7/2007 | Frailey | H04N 7/165 |
| 2007/0180062 | A1* | 8/2007 | Southerland | H04N 21/2187 709/219 |
| 2012/0054809 | A1* | 3/2012 | Chowdhury | H04N 21/2223 725/93 |
| 2012/0254456 | A1* | 10/2012 | Visharam | H04N 21/2343 709/231 |
| 2014/0189763 | A1* | 7/2014 | Panigrahi | H04N 21/2668 725/109 |
| 2014/0376623 | A1* | 12/2014 | Good | H04N 19/46 375/240.07 |

* cited by examiner

*Primary Examiner* — Omar S Parra
(74) *Attorney, Agent, or Firm* — Hogan Lovells US LLP

(57) ABSTRACT

A user can configure a real-time video encoding job using a profile including parameterized fields that enable a user to specify only the attributes that are specific to the video channel, as may include options for the audio and video codecs, stream packaging, input sources, video pipeline processors, and the like. When creating the profile, a user can define a set of parameters and their respective default values. Once the parameters are defined, any attribute in the profile may include one or more parameters as substrings using specific markup syntax. When persisting the data, a set of parameter records can be associated with the profile. Later, when a channel is to be created using the profile, any parameterized attribute in the profile may be overridden with a value specific to that channel as determined using the relevant set of parameter records.

17 Claims, 8 Drawing Sheets

New Profile — 402

Name: ParameterizedProfile
Description:
Link:

Parameters — 404

Network Location
- Name: network_in
- Value: udp://localhost:123

Interface
- Name: interface
- Value: abc1

Input 1 | Network Input — 406

Network Location: {{network_in}}
Interface: {{interface}}
Source:

Hot Backup   Clear Time   Fallback

FIG. 4

PARAMETERIZABLE ENCODING PROFILES

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Cloud resources, such as may be provided through one or more Web services, can be particularly beneficial for tasks such as video encoding, which can be very memory and processor intensive. In order to configure a real-time video encoding job, a user generally will have to specify a large set of options that control aspects of the encoding, such as the appropriate audio and video codecs, stream packaging, input sources, and video pipeline processors, among others. For users having many encoding tasks that are similar but not identical, repeatedly configuring the full definitions can be cumbersome at best, and is likely to result in at least some configuration errors for certain video streams.

BRIEF DESCRIPTION OF THE DRAWINGS

Various embodiments in accordance with the present disclosure will be described with reference to the drawings, in which:

FIG. 4 illustrates a first example user interface that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the encoding of media files and streams. In particular, various approaches enable a user to configure a real-time video encoding job using a parameterized profile that enables to user to specify only the parameters that are specific to the video channel, as may include options for the audio and video codecs, stream packaging, input sources, video pipeline processors, authentication credentials, process identifiers, and the like. A video encoding job or channel can be expressed in combination with a profile that defines many of the encoding options for the channel. When creating the profile, a user can define a set of parameters and their respective default values. Once the parameters are defined, any attribute in the profile may include one or more parameters as substrings using, for example, specific markup syntax. When persisting the data, a set of parameter records can be associated with the profile. Later, when a channel is created using the profile, any parameter in the profile may be overridden with a value specific to that channel.

Various other such functions can be used as well within the scope of the various embodiments as would be apparent to one of ordinary skill in the art in light of the teachings and suggestions contained herein.

Figure 1:
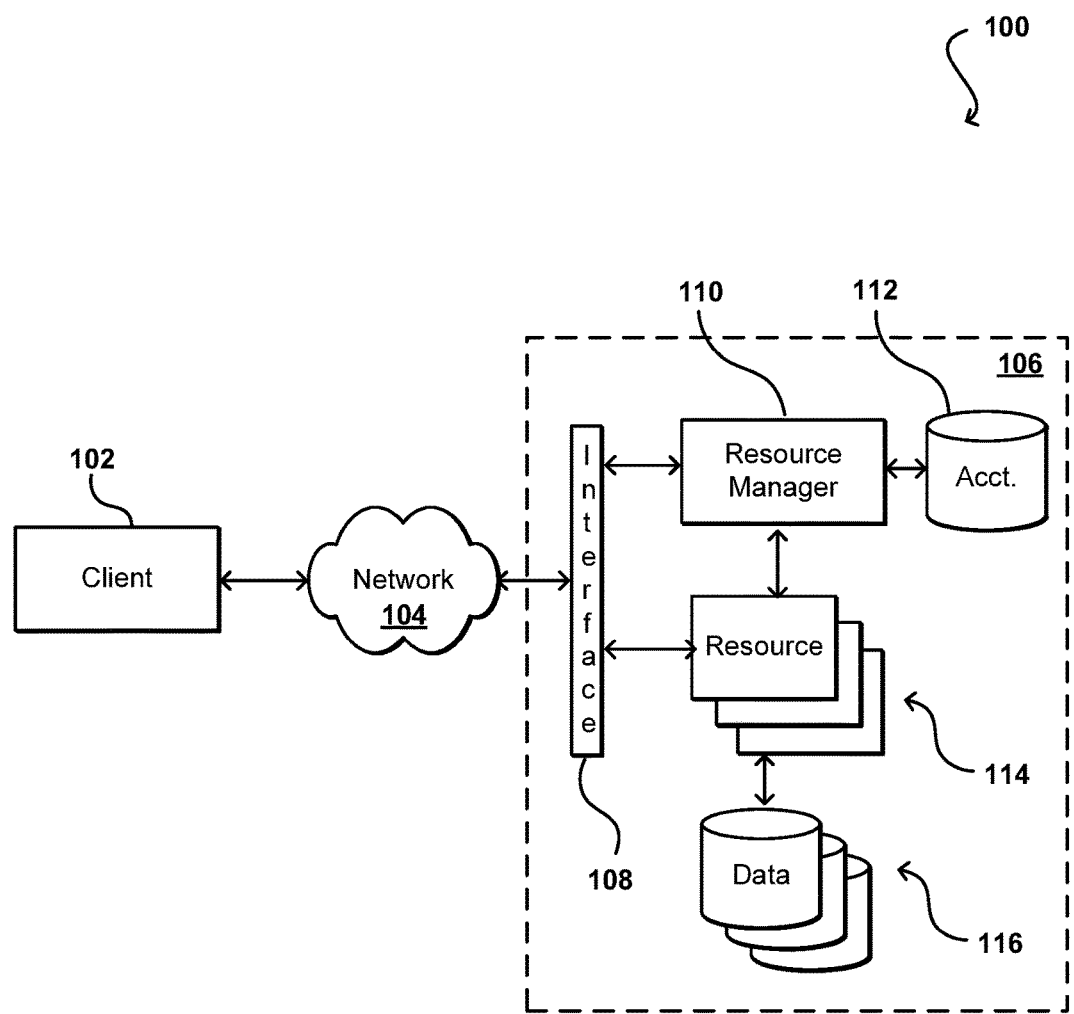
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
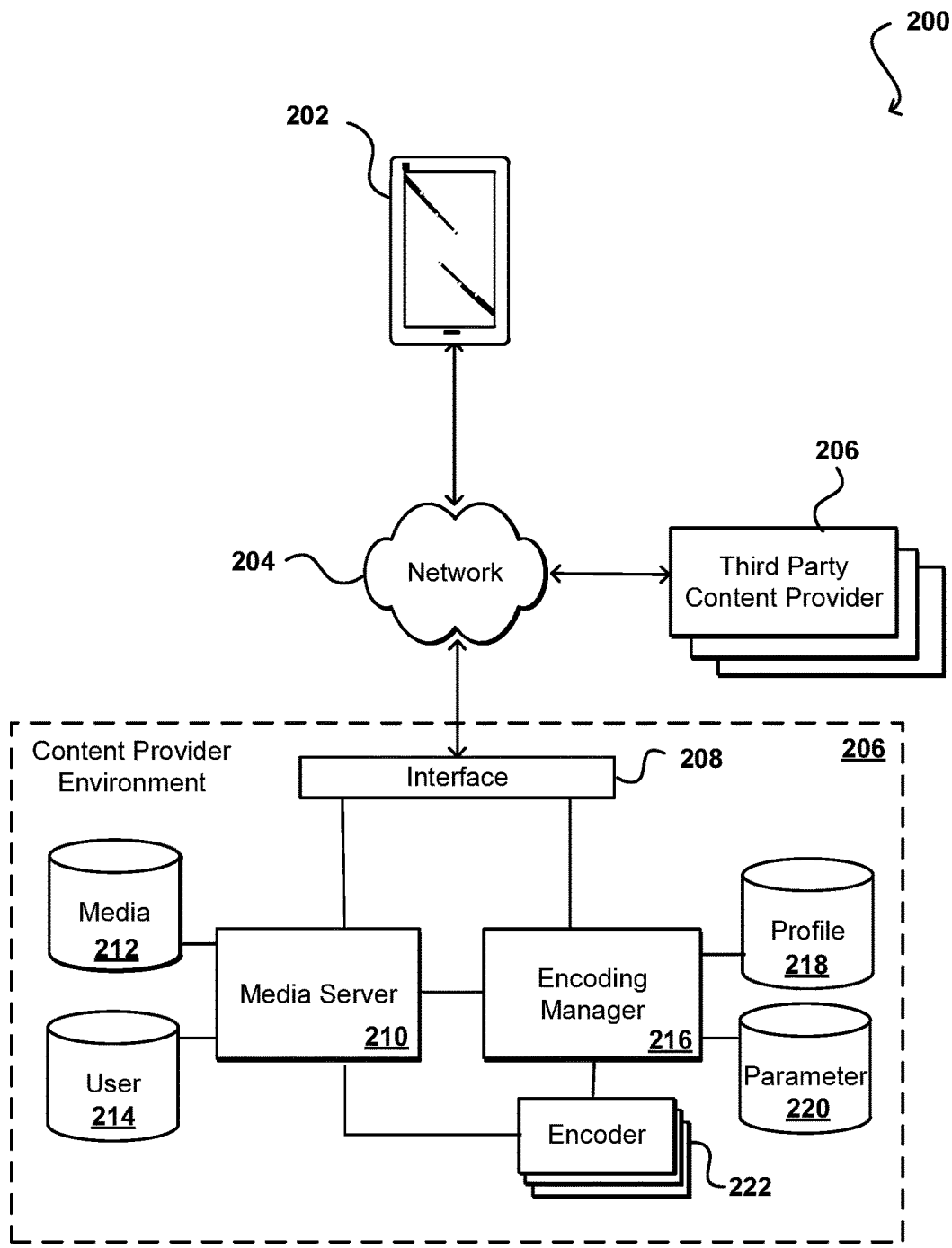
FIG. 2 illustrates an example subsystem for managing media file encoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 208. As mentioned, in at least some embodiments the request can include a request for content to be displayed on the computing device 202, and in many cases will include video or other media content that is encoded for presentation on the client device 202. The network(s) can include any appropriate network, such as the Internet, a local area network (LAN), a cellular network, an Ethernet, or other such wired and/or wireless network. The content provider environment 208 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 212 while a request to specify encoding parameters might be forwarded to an encoding manager 216, among other such options. These calls or requests can also come from third parties, although third party providers 506 can also provide at least some of the media content to be stored to a media repository 212 and encoded for display on the client device 202 as discussed herein.

In this example, a call received to the content provider environment 208 can be received by an interface layer 210 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from a client device 202 or third party provider 224 might include a request to specify one or more sets of encoding parameters to be used with a media file. Accordingly, these requests can be forwarded to an encoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the encoding manager 216 can use the profile and parameter data to determine the appropriate encoding information, and can pass that to one or more encoders 222, which can obtain the media file and encode the media file per the encoding information, which can then be provided to the client device by a media server 210 or other such component.

In some embodiments the encoding subsystem includes one or more encoders, a set of bitstreams (or video signals), and a content delivery network. The one or more encoders can include both encoders and packagers, which can be implemented via an origin server. A packager can receive a signal (e.g., feed), such as a video signal or a live stream. The live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN). The bitstreams can represent various encoded/packaged versions of the signal feed, as may be encoded per the encoding parameters from the encoding manager 216. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

As mentioned, a user of a client device 202 can specify many of these and other options in order to configure a real-time video encoding job. As an example, a user might have to specify options that control audio and video codecs, stream packaging, input sources, video pipeline processors, and more. Also as mentioned, the need to specify these options for a large number of similar encoding jobs can be cumbersome and error prone using conventional approaches.

Approaches in accordance with various embodiments can reduce this burden by utilizing parameterized profiles. A video encoding job or task, herein corresponding to a "channel," can be expressed in combination with a profile which defines many of the encoding options for the channel. When creating the profile, a user (or other appropriate entity) can define a set of parameters, including a respective default value for each parameter. In some embodiments default values may apply if not otherwise specified by the user. Once the parameters are defined, any attribute in the profile may include one or more of these parameters. In at least some embodiments, the parameters can be included as substrings using a special markup syntax. When persisting the data, a set of parameter records can be associated with the profile. A distinct parameterization record can also be created for each attribute in the data structure that references one of the parameters. When a channel is subsequently created using the profile, any parameter in the profile may be overridden (or replaced) with a value specific to that channel.

Such an approach can have several advantages over a simple non-parameterized profile (or templating) system. One advantage relates to flexibility, as a single profile can be used in a wider range of cases. Channel instances can be used to override a small number of attributes that can vary between contexts. Another advantage lies in the fact that the profile can still be completely validated at the time it is created, using the default values associated with the parameters. Further, any attribute in the profile may be parameterized regardless of its data type. Since all profile parameters have default values, a channel may underspecify parameters and simply accept the defaults that the profile provides in at least some embodiments.

Certain embodiments provide for parameterization of a restricted set of attributes in a profile, and can be limited to specific data types, such as strings. These embodiments may or may not also support default values. In such embodiments, the profile may only be able to be partially validated when created, so a user will not learn of certain kinds of errors until a channel is associated with it at a later time. The use of separate data structures for the parameters and "parameterizations" associated with a profile provides the flexibility to add additional features and behaviors to the parameterization mechanism, as may include applying additional constraints and validations on the parameters themselves or to the attributes into which they are substituted.

As mentioned, a specific video profile can be used to configure a channel pipeline for a customer or other entity. The profile can function as a template that can be used to create various channels with different properties. In many instances the variability will relate to the host name, port, or other destination or configuration option, while various other parameters for the channels will remain the same. For example, aspects such as the bit rate can be configurable but may be shared between video pipelines for channels. For the various channels, a common profile can be generated for use that becomes a static file that remains in the system for use by a customer. The customer can then use this profile for various channels without having to create a new profile for each channel. In order to provide the necessary flexibility, however, the profile can allow for parameterization. In at least some embodiments a marker string can be used to specify a parameter in the profile, such as a character string having double curly brackets at each end. The character string inside the brackets can indicate the variable or parameter name. Thus, instead of listing a specific destination hostname, for example, the value could be entered as {{hostname}}, which would enable the profile to refer to the appropriate parameter value for that field. By storing parameter data for each channel, the appropriate values can be substituted in the appropriate fields of the profile at the time for encoding. Such an approach is particularly valuable for non-string-type fields, such as integer fields, where the value cannot be stored. Enabling a string value to be stored in the profile field enables the profile to be validated before a customer attempts to use an invalid profile to create a channel for a video file or stream. In order to allow the validations to proceed, the actual parameter data can be stored "on the side" in the form of metadata, which can be substituted in at the time for encoding regardless of the value or field type. In at least some embodiments, the customer will provide the values through a console or other interface, such as a dedicated application programming interface (API), and the data can be transformed into metadata to be stored as parameter data for a specific channel, customer, and/or profile.

Figure 3:
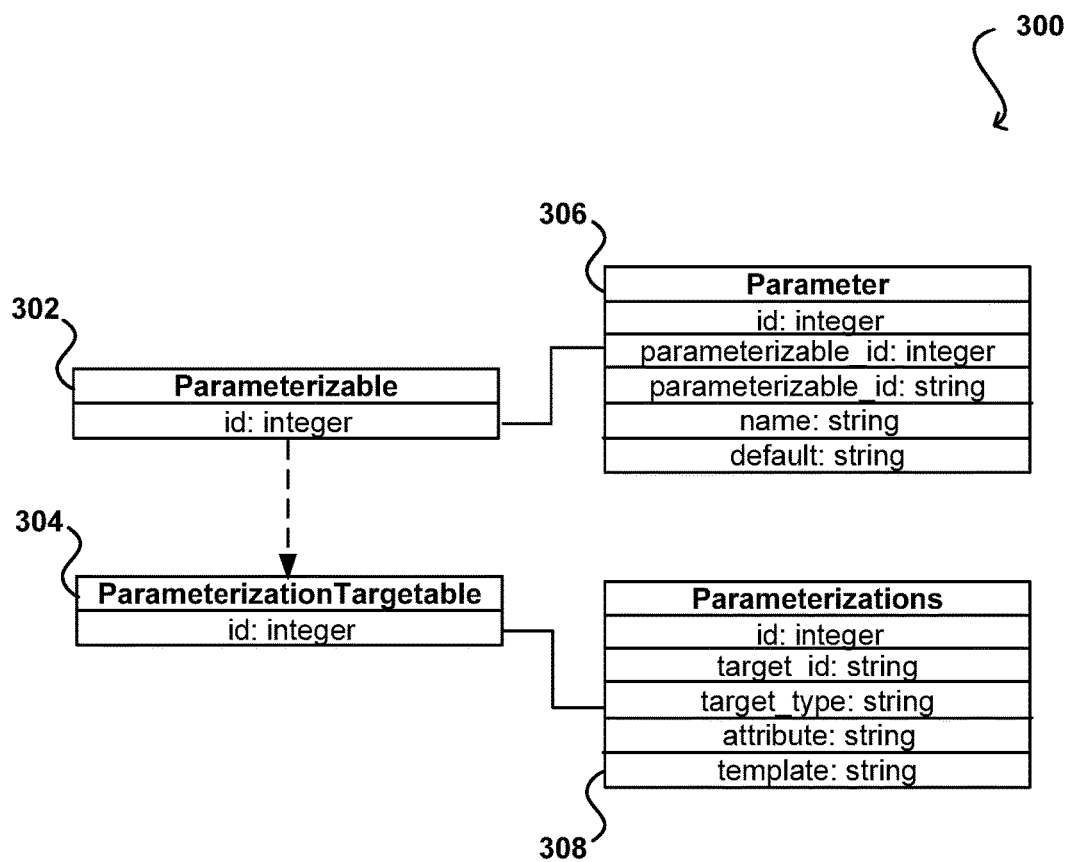
FIG. 3 illustrates an example data structure that can be utilized in accordance with various embodiments.

FIG. 3 illustrates an example profile parameterization approach 300 that can be utilized in accordance with various embodiments. Such an approach can enable a customer to parameterize specific fields in a profile, which can be used to create a respective channel. In this example, one or more fields 302 can be specified that are parameterizable, with the associated parameters 306 then able to be specified. For an integer value, for example, a parameterization can enable the integer field to be provided with a sting name and string default value that can be used to validate the profile. A similar set of one or more fields 304 can specify which values are parameterization targetable, with the specified parameterizations 308 being specified as well, as may include various target and attribute values for the targetable fields.

Such a profile can contain one or more parameter names surrounded by curly brackets, as mentioned, and multiple attributes of a profile may contain parameters sharing the same name. For every parameter name used throughout the profile, a parameter definition can be included at, for example, a top level of the profile file, which can be an XML file or other appropriate object. The parameter definition can include a default value, which can be used to validate the profile when it is created. An example of parameterizing an input URI in a profile is given by:

```
<profile>
  <parameters>
    <parameter>
      <name>host</name>
      <default>www.foo.com</default>
    </parameter>
    <parameter>
      <name>port</name>
      <default>8080</default>
    </parameter>
  </parameters>
  . . .
  <input>
    <uri>http://{{host}}:{{port}}/endpoint</uri>
  </input>
</profile>
```

When creating a channel associated with a profile, replacement values can be specified for all parameters present in the profile, as may be given by:

```
<channel>
  <profile_id>1</profile_id>
  <channel_params>
    <host>foo</host>
    <port>80</port>
  </channel_params>
</channel>
```

In this example, the resulting input URI will be: foo:8080/endpoint. When creating a channel, it can be important to know which parameters are present in a specific profile. These can be retrieved using a new endpoint, such as by GET/profiles/:id/parameters. Upon saving a channel, its parameters will be substituted into the profile and validated. A channel parameter will be substituted into every occurrence of a profile parameter with the same name. Upon starting a channel, its parameters will be substituted into the profile in order to generate the file to send to the encoder. Existing profiles in the database can be migrated and continue to be fully functional.

In order to set up such a channel, a customer (or other entity) can first create a profile, such as by using a user interface 400 similar to the example illustrated in FIG. 4. Although the example relates to a Web interface that might be displayed through a browser, it should be understood that various other interfaces or consoles can be used as well as discussed and suggested herein. In this example, a user can specify a name, description, and other basic values 402 for the profile. The customer can also be presented with information regarding the various parameters 404 for the profile, and in some instances the customer can be informed as to which fields are parameterizable. In at least some embodiments, any field is potentially parameterizable. In this example, a customer has chosen to parameterize the network location and interface fields for a first input 406, here illustrate by a string name contained within double curly brackets (although other designations can be used as discussed and suggested herein). In this way, the profile can be validated, created, stored, and used to create multiple channels, where the appropriate network locations and interfaces can be specified as appropriate for each channel. When the user is finished updating the profile data, the profile data can be submitted to a server or other component for processing the parameter attributes and performing validation of the profile.

In one embodiment, each parameter submitted from a browser to a webserver will need to be analyzed to ensure the value corresponds to the template syntax. One or more template patterns can be used, and detection of any of those patterns can cause the information to be pre-processed to essentially move that information into a different set of attributes. The information can be analyzed to utilize the default values for each field for validation. A separate set of metadata can be generated that can be submitted with the parameters for storage with the profile data. Parameter values can be obtained from the profile data as well as from the user interface or API. The metadata in at least some embodiments can be stored as a separate metadata table that represents, for that profile, all the metadata information. In at least some embodiments, the table requires values in the columns for at least variable name and default value, although others can be specified as well, such as is illustrated in FIG. 3. In some embodiments a deeply nested object model can be used that represents the profile, the knowledge of what has been parameterized can be stored on the specific database table related to that object. There can also be a foreign key relation to the parameterization, which allows the validations to be passed with the parameters without giving the customer a profile that has the default values. They customer is able to view the profile as a parameterized profile. The information, database tables, and the foreign key relations are stored for use in performing a subsequent lookup to substitute the values needed to create a specific channel. The profiles created can be mutable or immutable in various embodiments, where mutable profiles may require revalidation.

Figure 5:
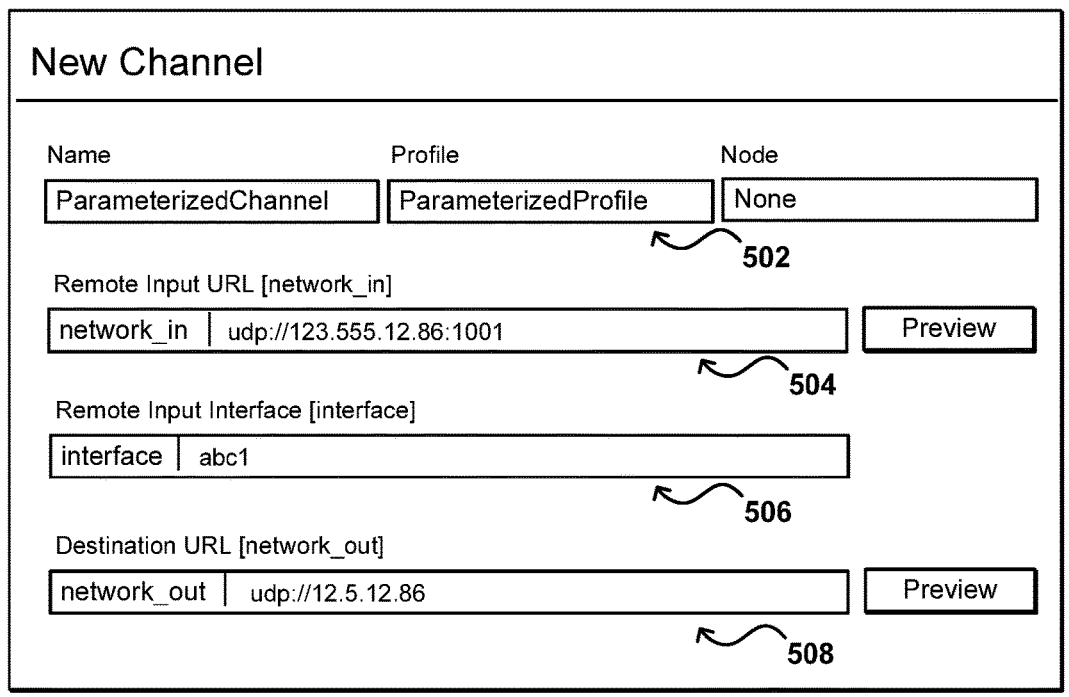
FIG. 5 illustrates a second example user interface that can be utilized in accordance with various embodiments.

FIG. 5 illustrates another example interface 500 that can be used to create a channel in accordance with various embodiments. In this interface, the user is able to specify basic values 502, such as the name of the channel and the appropriate profile. When generating the channel, the profile can be used along with the appropriate parameter values. In this example, the user can then specify values for the specific parameters for that profile. In this example, the user can specify the input URL 504, the input interface 506, and the destination or output URL 508. These values can then be stored along with the profile as the appropriate metadata for this channel. The fields 504, 506, 508 shown in this example can update with a change in selected profile 502, in order to enable the user to provide channel-specific values for the parameters of the profile. If the user does not provide a value specific for the channel, then the default value will be used in at least some embodiments.

Figure 6:
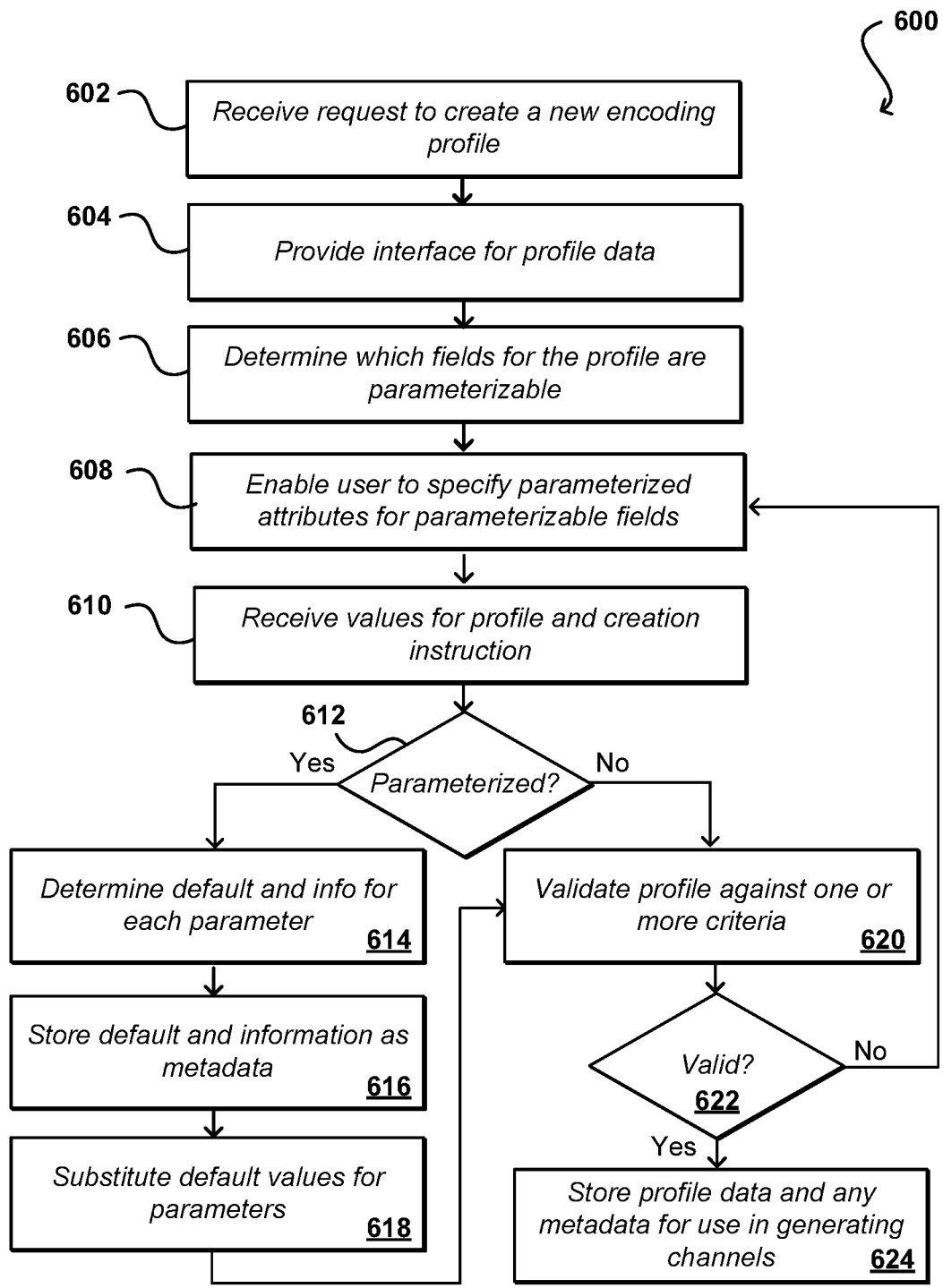
FIG. 6 illustrates an example process for generating encoding profiles and parameters that can be utilized in accordance with various embodiments.

FIG. 6 illustrates an example process 600 for creating a media profile for a channel pipeline that can be utilized in accordance with various embodiments. It should be understood that for any process herein there can be additional, fewer, or alternative steps performed in similar or alternative orders, or in parallel, within the scope of the various embodiments unless otherwise specifically stated. In this example, an instruction is received 602 to create a new profile on behalf of a customer. An interface can be provided 604 that enables the customer to provide values to be used to create the profile. A determination can be made 606 to which fields are parameterizable, and the user can be enabled 608 to provide parameterized values in those fields. The values for the various fields can be received 610, which can be specified by the user or taken from suggested or default values. A determination can be made 612 as to whether any fields were parameterized. If so, the corresponding information for each parameterized field can be determined 614, as may include the default value and field type. The information for the parameterized fields can then be stored 616 as metadata to a data table or other appropriate location associated with the profile. In order to validate the profile, the default values can be substituted 618 in for the parameterized strings in the profile data. The profile data can then be validated 620 against one or more criteria. A determination can be made 622 as to whether the profile is valid. If so, the profile data can be stored 624 for use in creating new channels, and if any fields were parameterized then the profile data can be associated with the metadata. If the profile is not valid, the user can be prompted to make any appropriate changes and a revalidation can occur.

Figure 7:
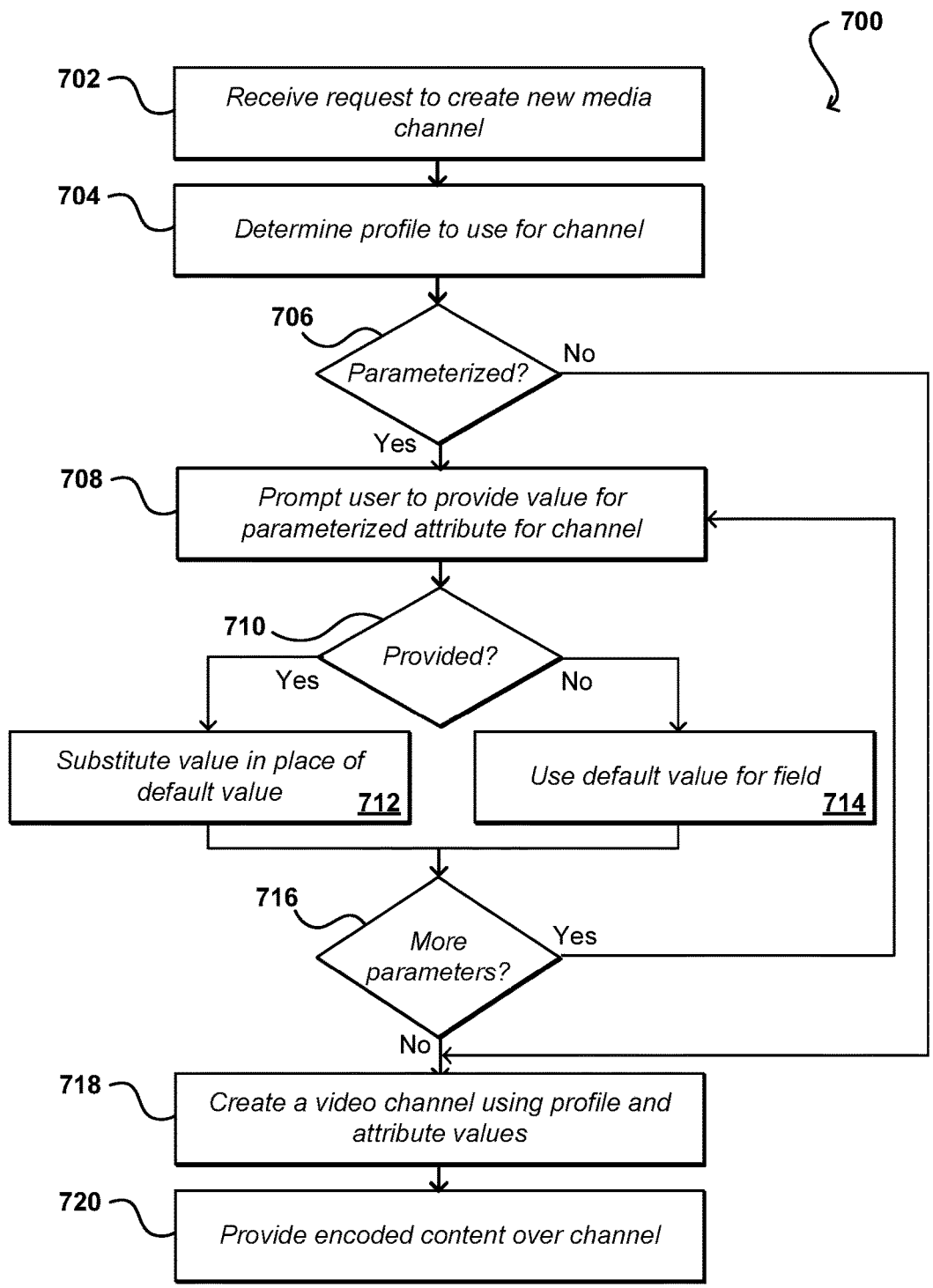
FIG. 7 illustrates an example process for performing media encoding that can be utilized in accordance with various embodiments.

FIG. 7 illustrates an example process 700 for creating a new channel based on a media profile that can be utilized in accordance with various embodiments. In this example, a request can be received 702 for a new channel. A profile to use for the channel can be determined 704, such as where the profile is associated with, or otherwise specified by, the customer submitting the request. A determination can be made 706 as to whether any of the fields in the profile are parameterized. While any fields can be parameterizable in many embodiments, common fields for parameterizing include destinations, source addresses, interfaces, program identifiers, and bit rates, among others. If one or more parameterized fields exist for the profile, the user can be prompted 708 to provide a value for the field. A determination can be made 710 as to whether a value is provided. If so, that value specified can be substituted 712 in place of the default value for purposes of creating the channel. As mentioned, the value can be a single provided value or a calculated value, or can be comprised of one or more substrings that can be separately provided or calculated in accordance with various embodiments. In some instances a field value can include values for various substrings, which can include static values, default values, and/or provided/ calculated values, which can then be combined for purposes of substitution in the profile. In some values a single parameter or parameter value can be used for multiple profile fields as well. If a value is not provided, or otherwise generated or obtained, the default value for the field can be used 714. If it is determined 716 that there are more parameterized fields, then the process can continue. Otherwise, the profile with the appropriate field values can be used to create 718 a video channel based on the profile that uses the appropriate field values as specified by the customer, but without the customer having to specify each value to be used for the encoding. The appropriate media content can then be provided 720 over the corresponding channel.

Figure 8:
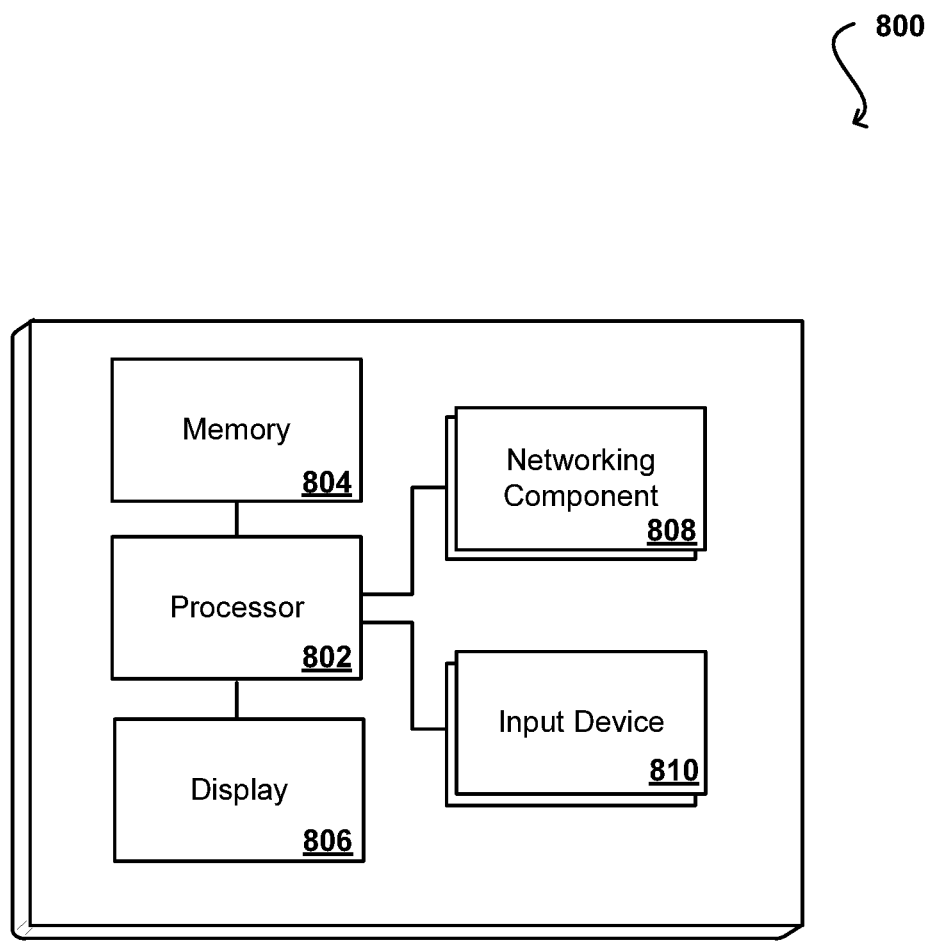
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a first request to create a profile for a set of channels, each channel of the set of channels associated with delivery of video content using a channel-specific encoding;
   receiving at least one parameterized string for at least one field of the profile, the at least one field relating to at least one aspect of the channel-specific encoding, the profile further including at least one static field that is not parameterized;
   storing information for the at least one parameterized string to a set of records associated with the profile, the information stored as metadata in a data table associated with the profile and specifying at least an input interface and an output URL for the profile, the information including at least a respective default value for each parameterized string, the at least one respective default value being determined for the at least one parameterized string from the set of records associated with the profile;
   receiving a second request to create a video delivery channel, the second request specifying the profile;
   enabling a respective channel-specific value to be provided for at least one parameterized string in the profile, the channel-specific value comprising an authentication credential;
   utilizing the respective default value for at least one parameterized string in the profile in response to the authentication credential not being provided for the at least one parameterized string;
   creating the video delivery channel using the respective default value and values from the at least one static field of the profile; and
   causing encoded video content to be delivered to an identified destination via the video delivery channel.

2. The computer-implemented method of claim 1, further comprising:
   substituting the respective default value for each parameterized string in the profile; and
   validating the profile according to at least one validation criteria before storing the profile and the set of records.

3. The computer-implemented method of claim 1, further comprising:
   encoding the encoded video content as the encoded video content is to be delivered via the video delivery channel.

4. The computer-implemented method of claim 1, wherein the at least one parameterized string relates to at least one of an input source, a destination, a host name, a port, an interface, a codec, a stream packaging, a process identifier, or a pipeline processor for the video delivery channel.

5. A computer-implemented method, comprising:
   receiving a request associated with encoded video content;
   determining a profile associated with the request, the profile including at least one parameterized string;
   storing information for the at least one parameterized string to a set of records associated with the profile, the information stored as metadata in a data table associated with the profile and specifying at least an input interface and an output URL for the profile, the information including at least a respective default value for each parameterized string, and the at least one respective default value determined for the at least one parameterized string from the set of records associated with the profile;
   substituting, in place of the at least one respective default value for the at least one parameterized string, any channel-specific values received for delivery of the encoded video content, at least one channel-specific value comprising an authentication credential;

utilizing the at least one respective default value for at least one parameterized string in the profile in response to the authentication credential not being provided for the at least one parameterized string;

creating a video delivery channel according to the at least one static encoding value and the at least one respective default value; and delivering, to a destination using the video delivery channel, the encoded video content encoded according to the channel-specific values.

6. The computer-implemented method of claim 5, further comprising:

receiving a second request;

determining the profile associated with the request;

substituting, in place of the at least one respective default value for the at least one parameterized string, any channel-specific values received for delivery of the encoded video content in response to the second request; and creating a second video delivery channel having at least one different channel-specific value than the video delivery channel.

7. The computer-implemented method of claim 5, further comprising:

receiving a request to create the profile; and receiving the at least one parameterized string for at least one field of the profile, the at least one field relating to at least one aspect of the encoding, the profile further including at least one static encoding value that is not parameterized.

8. The computer-implemented method of claim 5, further comprising:

substituting a respective default value for each parameterized string in the profile; and validating the profile according to at least one validation criteria before storing the profile and the set of records.

9. The computer-implemented method of claim 5, further comprising:

encoding the encoded video content as the encoded video content is to be delivered via the video delivery channel.

10. The computer-implemented method of claim 5, wherein the at least one parameterized string relates to at least one of an input source, a destination, a host name, a port, an interface, a codec, a stream packaging, a process identifier, or a pipeline processor for the video delivery channel.

11. The computer-implemented method of claim 5, further comprising:

designating the at least one parameterized string in the profile using an indicator associated with a respective string variable, the at least one parameterized string corresponding to a field capable of being of any of a plurality of data types.

12. The computer-implemented method of claim 5, further comprising:

receiving the channel-specific values through an application programming interface (API) associated with a video encoding service.

13. A system, comprising:

at least one processor; and memory including instructions that, when executed by the at least one processor, cause the system to:

receive a request associated with encoded video content;

determine a profile associated with the request, the profile including at least one static encoding value and at least one parameterized string, the at least one parameterized string having at least one respective default value;

store information for the at least one parameterized string to a set of records associated with the profile, the information stored as metadata in a data table associated with the profile and specifying at least an input interface and an output URL for the profile, the at least one respective default value determined for the at least one parameterized string from the set of records associated with the profile;

substitute, in place of the at least one respective default value for the at least one parameterized string, any channel-specific values received for delivery of the encoded video content, at least one channel-specific value comprising an authentication credential;

utilize the respective default value for at least one parameterized string in the profile in response to the authentication credential not being provided for the at least one parameterized string;

create a video delivery channel according to the at least one static encoding value and the at least one parameterized string; and deliver, to a destination using the video delivery channel, the encoded video content encoded in response to the request according to the at least one static encoding value and the at least one parameterized string.

14. The system of claim 13, wherein the instructions when executed further cause the system to:

receive a second request;

determine the profile associated with the request;

substitute, in place of the at least one respective default value for the at least one parameterized string, any channel-specific values received for delivery of the encoded video content in response to the second request; and create a second video delivery channel having at least one different channel-specific value than the video delivery channel.

15. The system of claim 13, wherein the instructions when executed further cause the system to:

receive a request to create the profile; and receive the at least one parameterized string for at least one field of the profile, the at least one field relating to at least one aspect of the encoding, the profile further including the at least one static encoding value that is not parameterized.

16. The system of claim 13, wherein the instructions when executed further cause the system to:

substitute the respective default value for each parameterized string in the profile; and validate the profile according to at least one validation criteria before storing the profile and the set of records.

17. The system of claim 13, wherein the at least one parameterized string relates to at least one of an input source, a destination, a host name, a port, an interface, a codec, a stream packaging, a process identifier, or a pipeline processor for the video delivery channel.

* * * * *